SINGLE STAGE AMPLIFIER-DETECTOR-AMPLIFIER

Filed Aug. 22, 1952 3 Sheets-Sheet 1

JOHN G. SPRACKLEN
*INVENTOR.*

BY Francis W. Crotty
HIS ATTORNEY

March 12, 1957 J. G. SPRACKLEN 2,785,299

SINGLE STAGE AMPLIFIER-DETECTOR-AMPLIFIER

Filed Aug. 22, 1952 3 Sheets-Sheet 2

JOHN G. SPRACKLEN
*INVENTOR.*

BY Francis W. Crotty
HIS ATTORNEY

JOHN G. SPRACKLEN
*INVENTOR.*

BY Francis W. Crotty

HIS ATTORNEY.

United States Patent Office 2,785,299
Patented Mar. 12, 1957

2,785,299

SINGLE STAGE AMPLIFIER-DETECTOR-AMPLIFIER

John G. Spracklen, Chicago, Ill., assignor to Zenith Radio Corporation, a corporation of Illinois Application August 22, 1952, Serial No. 305,875

12 Claims. (Cl. 250—20)

Figure 1:
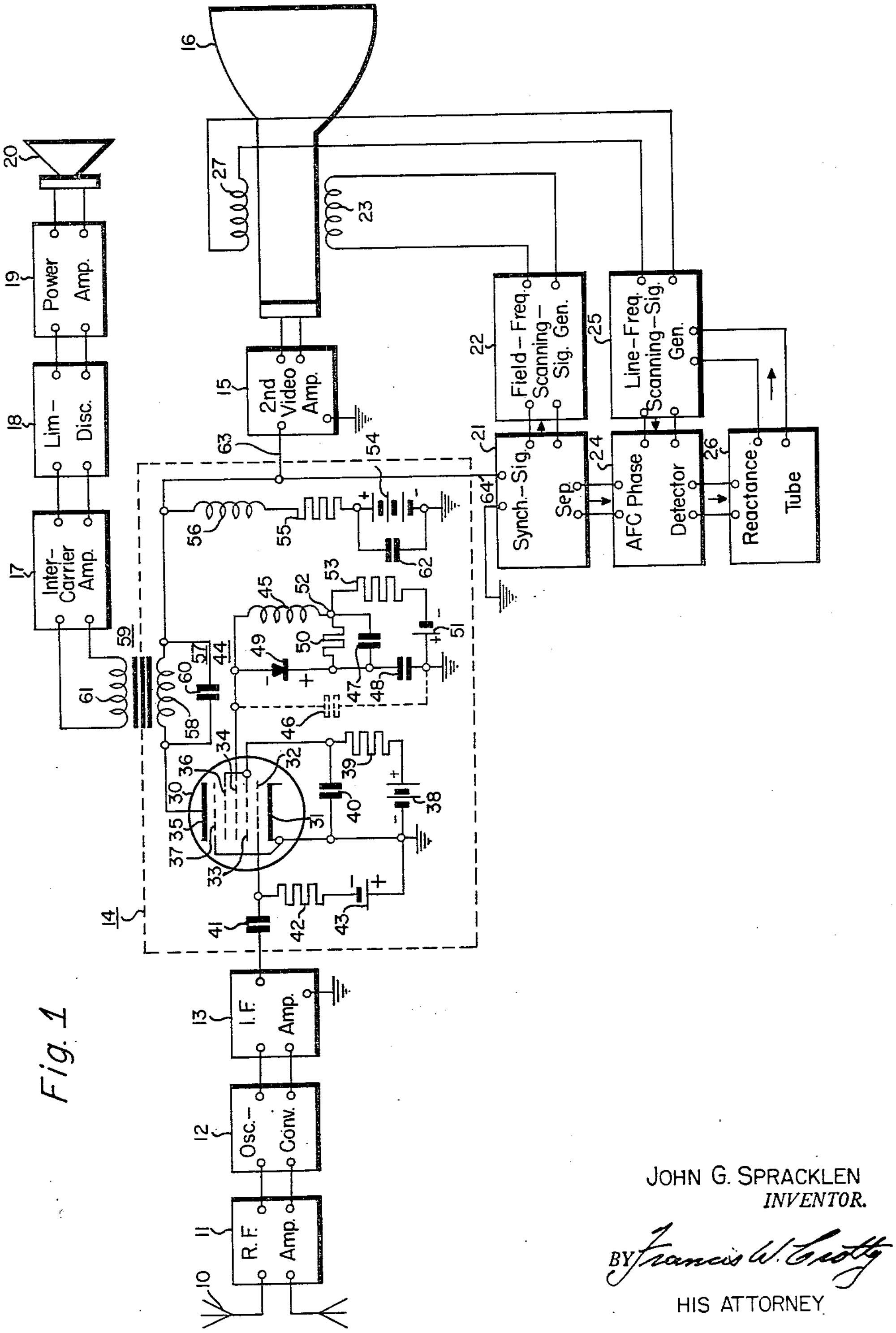

This invention relates to wave-signal translating apparatus and more particularly to such apparatus which is particularly adapted to amplification and demodulation of modulated wave-signals. This application is a continuation-in-part of copending application Serial No. 154,089, filed March 29, 1950, now abandoned, for "Wave-Signal Translating Apparatus," and assigned to the present assignee.

In the reception of modulated wave-signals, it is conventional practice to heterodyne the incoming radio-frequency signal with a locally-generated constant-frequency signal to provide a modulated intermediate-frequency signal. The modulated intermediate-frequency signal is amplified and demodulated to provide an audio-frequency or video-frequency signal representing the modulation components of the original wave-signal, and the detected signal thus obtained is amplified and applied to a suitable utilization device such as a loudspeaker or an image-reproducing device. Conventionally, several cascaded stages are utilized to provide the desired intermediate-frequency amplification, and separate independent stages are ordinarily used to effect demodulation and subsequent amplification of the modulation components. Thus, for example, in a conventional television receiver, four cascaded stages of intermediate-frequency amplification may be used, followed by a rectifier device for video-frequency demodulation and two cascaded stages of video-frequency amplification.

It is an important object of the present invention to provide novel and improved wave-signal translating apparatus for providing in a single stage amplification of both a modulated wave-signal and the modulation components of such amplified signal after demodulation.

It is a further object of the invention to provide improved wave-signal translating apparatus for combining in a single stage the functions of modulated wave-signal amplification, demodulation, and subsequent amplification of the modulation components.

Still another object of the invention is to provide new and improved wave-signal translating apparatus for combining in a single stage the functions of two or more separate and independent stages of conventional wave-signal receivers, thereby effecting a substantial cost saving in receiver manufacture.

In accordance with the invention, the above and other objects are achieved by providing an electron-discharge device including in the order named, a cathode, a first control grid, an accelerating electrode, a second control grid, and an output electrode. An input circuit is provided for impressing an amplitude-modulated wave-signal, having a predetermined carrier frequency, between one of the control grids and the cathode. There is also provided a circuit from the other control grid to the cathode including a resonant two-terminal load circuit having one terminal coupled externally of the electron-discharge device to the other control grid only and having an impedance at the input-signal frequency which is greater than the reciprocal of the effective transconductance, at the input-signal frequency, of the input control grid with respect to the other control grid for developing an amplified replica of the modulated input-signal. Means are coupled to the other control grid and to the cathode for effecting separation of the modulation components from the amplified modulated wave-signal and for substantially modulating the electron flow to the output electrode in accordance with the modulation components of the amplified input-signal replica. Means, including an output load circuit coupled to the output electrode and to the cathode for utilizing the transconductance of the other control grid with respect to the output electrode, are provided for amplifying the modulation components.

In accordance with another feature of the invention as adapted to a television receiver, an intercarrier-frequency circuit, tuned to a frequency corresponding to the frequency difference between the video-carrier and sound-carrier components of the input composite television signals, is included in the output circuit either in addition to or in place of the video-frequency load circuit.

Figure 2:
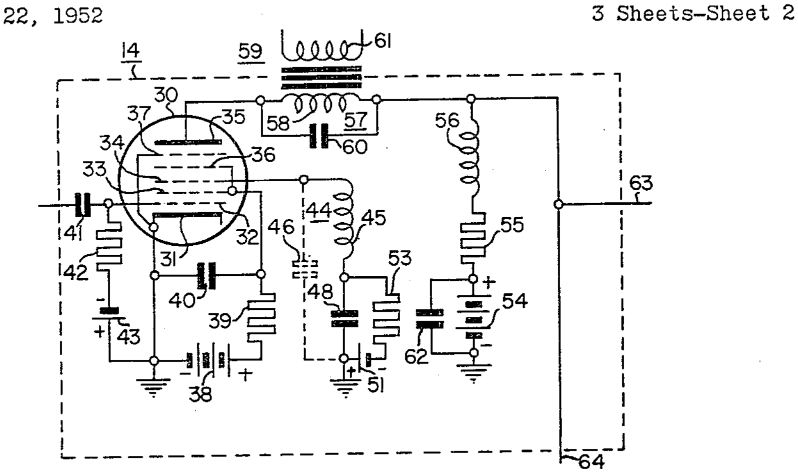
Figure 3:
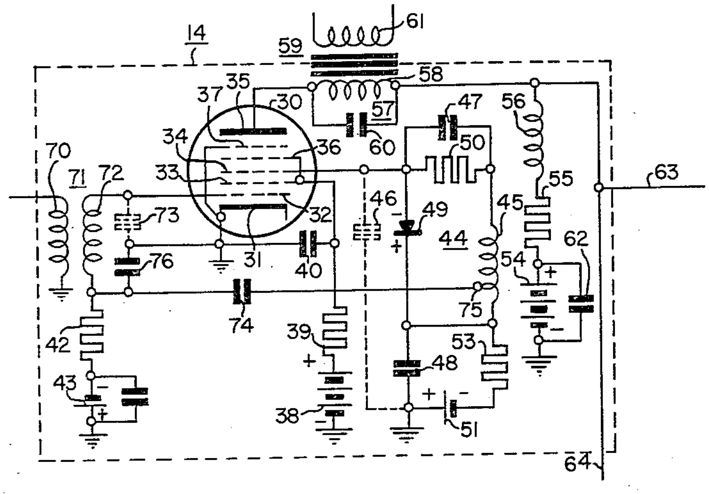
Figure 4:
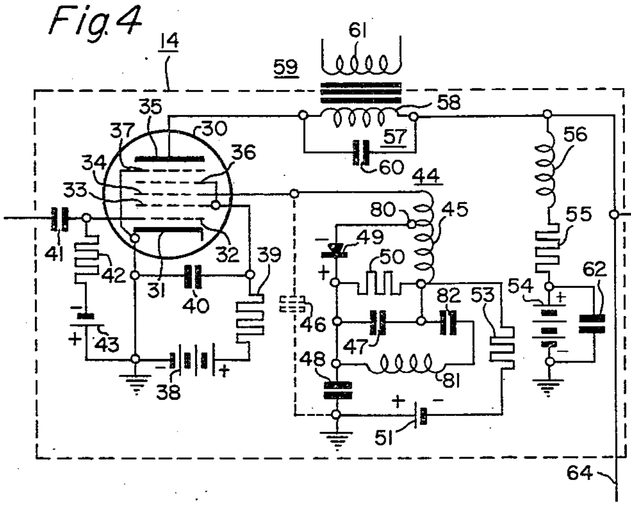
Figure 5:
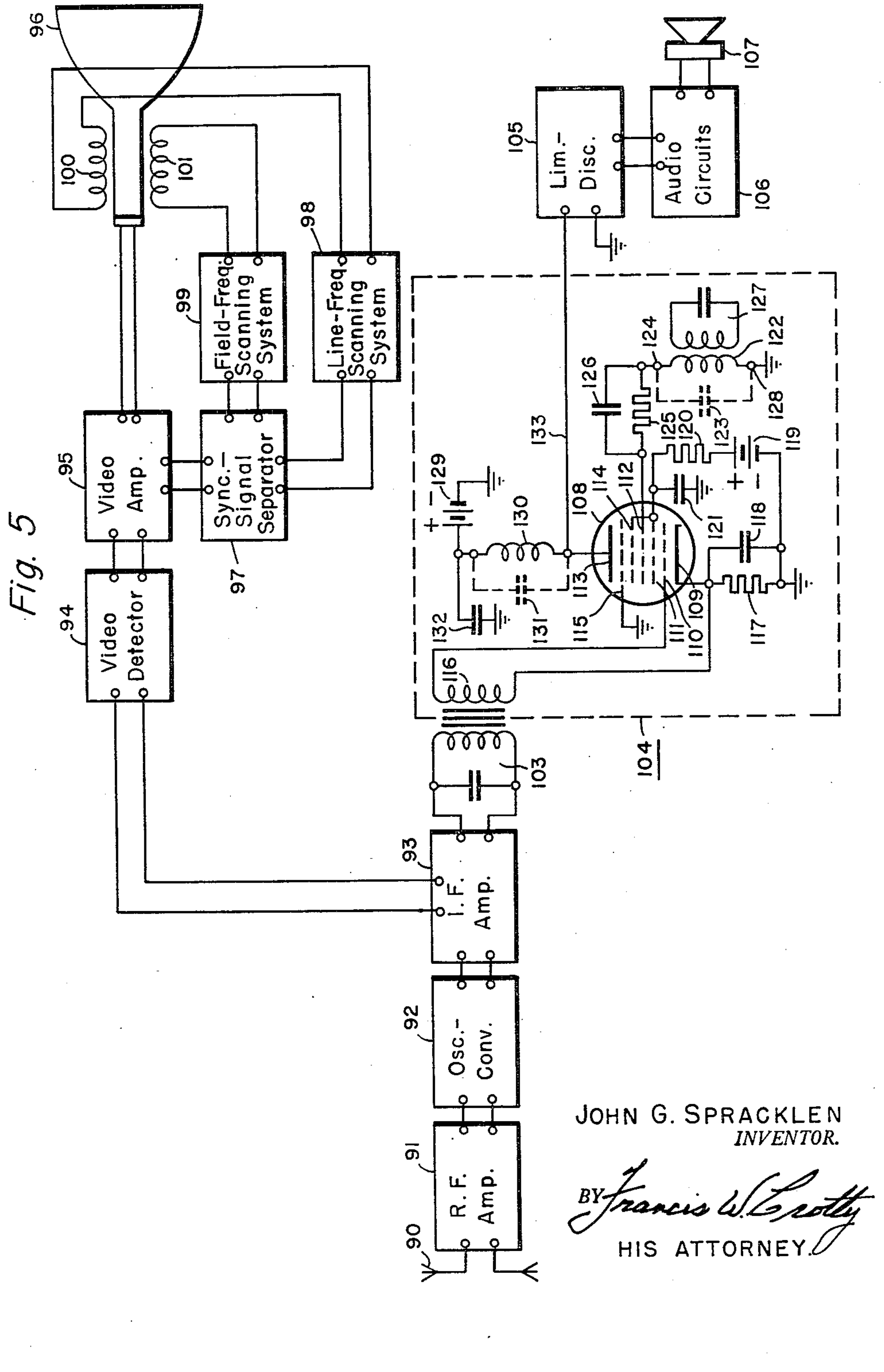

The features of the present invention which are believed to be novel are set forth with particularity in the appended claims. The invention, together with further objects and advantages thereof, may best be understood, however, by reference to the following description taken in connection with the accompanying drawings, in the several figures of which like reference numerals indicate like elements, and in which:

Figure 1 is a schematic diagram of a television receiver embodying novel wave-signal translating apparatus constructed in accordance with the present invention;

Figures 2, 3, and 4 are schematic diagrams of other embodiments of the invention, and Figure 5 is a schematic diagram of a television receiver utilizing certain principles of the present invention.

In Figure 1, incoming composite television signals are intercepted by an antenna 10 and impressed on a radio-frequency amplifier 11 consisting of one or more stages. Amplified composite television signals from radio-frequency amplifier 11 are heterodyned with locally-generated constant-frequency oscillations in an oscillator-converter 12 to provide an intermediate-frequency signal which is applied to an intermediate-frequency amplifier 13 consisting of one or more stages. The amplified intermediate-frequency composite television signal from intermediate-frequency amplifier 13 is impressed upon wave-signal translating apparatus 14, constructed in accordance with the invention, for further intermediate-frequency amplification, demodulation, and amplification of the modulation components in a manner to be hereinafter described.

Detected and amplified video-frequency components from wave-signal translating apparatus 14 are applied to a second video-frequency amplifier 15 and thence to the input circuit of a cathode-ray tube 16 or other image-reproducing device.

The receiver schematically illustrated in Figure 1 is of the intercarrier sound type which, per se, is well known in the art. Wave-signal translating apparatus 14 is constructed and arranged to provide an intercarrier sound signal which is applied to an intercarrier amplifier 17. The amplified intercarrier sound signal from amplifier 17 is amplitude-limited and demodulated in a limiter-discriminator 18, and the audio-frequency output from limiter-discriminator 18 is impressed on a power amplifier 19 and thence on a loudspeaker 20 or other sound-reproducing device.

The detected and amplified composite video signal from wave-signal translating apparatus 14 is also applied to a synchronizing-signal separator 21 which operates to derive line-frequency and field-frequency synchronizing-signal pulses for driving the scanning apparatus associated with image-reproducing device 16. Field-frequency synchronizing-signal pulses from synchronizing-signal separator 21 are supplied to a field-frequency scanning-signal generator 22 which drives a field-frequency scanning coil 23 associated with image-reproducing device 16. Line-frequency synchronizing-signal pulses from synchronizing-signal separator 21 are applied to an automatic-frequency-control (AFC) phase-detector 24 for phase comparison with the output of a line-frequency scanning-signal generator 25. The output of AFC phase-detector 24 is supplied to a reactance tube 26 which operates to control the frequency of generator 25 to maintain synchronism with the incoming signal. The output of line-frequency scanning-signal generator 25 is supplied to a line-frequency deflection coil 27 associated with image-reproducing device 16 in a conventional manner.

With the exception of wave-signal translating apparatus 14, the construction and operation of the receiver of Figure 1 are quite conventional. It has been found convenient to illustrate a receiver of the intercarrier sound type since the invention is of particular advantage as applied to such receivers, but it is to be clearly understood that the invention may be applied with advantage to receivers utilizing a separate sound channel or other type of sound system.

More particularly, wave-signal translating apparatus 14, which performs the several functions of intermediate-frequency amplification, video-frequency demodulation, intercarrier-sound detection, and video-frequency and intercarrier-frequency amplification, comprises an electron-discharge device 30 having in the order named, a cathode 31, a first control grid 32, an accelerating electrode 33 which may conveniently be formed as a screen grid, a second control grid 34, and an output electrode or anode 35. If desired, device 30 may also comprise a screen grid 36 and a suppressor grid 37 between second control grid 34 and output electrode 35. The cathode 31 of device 30 is directly connected to ground, and accelerating electrodes 33 and 36 are connected through a decoupling resistor 39 to the positive terminal of a suitable source of unidirectional operating potential, here shown as a battery 38, the negative terminal of which is grounded. Accelerating electrodes 33 and 36 are bypassed to ground by means of a condenser 40. Suppressor grid 37 is directly connected to cathode 31.

The intermediate-frequency signal from amplifier 13 is impressed between first control grid 32 and cathode 31 by means of an input circuit comprising a coupling condenser 41 and a grid resistor 42. A suitable source of negative unidirectional operating potential, here shown as a battery 43, may be included in the direct-current return path from control grid 32 to cathode 31 to provide a suitable operating bias for control grid 32.

There is also provided a circuit from second control grid 34 to cathode 31, through ground, which includes a two-terminal load circuit 44. Load circuit 44 consists essentially of an inductor 45 which is coupled in parallel with the interelectrode capacity 46 between second control grid 34 and cathode 31 by means of a small condenser 47 connected in series with a large condenser 48. One terminal of load circuit 44 is coupled externally of device 30 to control grid 34 only.

The circuit from second control grid 34 to cathode 31 also includes a rectifier device 49, such as a crystal, diode, or other unilaterally conductive device, which is connected to control grid 34 directly and to ground through condenser 48. A resistor 50 is connected in parallel with condenser 47 to constitute therewith a passive load network for rectifier device 49. Suitable operating bias potential for second control grid 34 is provided by means of a battery 51 or other suitable potential source, the positive terminal of which is grounded and the negative terminal of which is coupled to the low-potential terminal 52 of coil 45 by means of a decoupling resistor 53.

Suitable positive unidirectional operating potential is supplied to output electrode 35 from a battery 54 or other operating potential source through a video-frequency load impedance comprising a resistor 55 and a peaking coil 56, and through a parallel-resonant circuit 57 comprising the primary winding 58 of a transformer 59 and a condenser 60. Circuit 57 is tuned to the intercarrier frequency, and the secondary winding 61 of transformer 59 is coupled to intercarrier amplifier 17. Battery 54 is bypassed to ground by means of a condenser 62.

The detected and amplified video-frequency signal appearing across resistor 55 and peaking coil 56 is supplied to second video amplifier 15 by means of lead 63 and to synchronizing-signal separator 21 by means of lead 64.

Briefly, wave-signal translating apparatus 14 serves to provide intermediate-frequency amplification, video-frequency demodulation, intercarrier-sound detection, and intercarrier-frequency and video-frequency amplification. The intermediate-frequency signal impressed on first control grid 32 is amplified by virtue of the space charge coupling from first control grid 32 to second control grid 34, and an amplified replica of the intermediate-frequency input signal appears across load circuit 44. Rectifier device 49 and its associated load network comprising resistor 50 and condenser 47 operate to demodulate the amplified replica of the modulated input signal and to impress the demodulated signal on control grid 34. This detected signal appears in amplified form across resistor 55 and peaking coil 56 by virtue of the transconductance of second control grid 34 with respect to output electrode 35. The video-carrier and audio-modulated sound-carrier components of the amplified signal developed at second control grid 34 are also intermodulated by rectifier 49 to produce an audio-modulated intercarrier sound signal which appears in amplified form across tuned circuit 57.

More particularly, it is known in the art that whenever a low-potential control grid is placed in the path of an electron stream in a position following a high-potential accelerating electrode, a virtual cathode is produced in the vicinity of the control grid. As the intensity of the electron stream projected through the accelerating electrode is varied in accordance with an input signal, the charge density of the virtual cathode is varied in a corresponding manner, and if a suitable inductive load is connected to the low-potential control grid, an amplified replica of the input signal is induced at the control grid by space charge coupling from the input grid. This space charge coupling effect has been formally likened to a unilateral negative capacity having a magnitude of the order of a few micro-microfarads. Because it is unilateral in nature, it may be considered as providing an effective transconductance from the input grid to the low-potential control grid having a magnitude of $2\pi fC$, where $f$ is the input-signal frequency and C is the equivalent space charge coupling capacity.

In order to provide intermediate-frequency amplification between first control grid 32 and second control grid 34, therefore, the impedance of two-terminal load circuit 44 at the intermediate-frequency is made greater than the reciprocal of the effective transconductance, at the intermediate-frequency, of first control grid 32 with respect to second control grid 34. Since amplification may be computed as the product of the effective transconductance and the load impedance, as is well known in the art, amplification or gain greater than unity is thus achieved. In practice, ratios of load impedance to reciprocal effective transconductance much greater than unity are preferred; for example, ratios of 10 or more have been employed with eminent success.

In accordance with the invention, the circuit from second control grid 34 to cathode 31 includes a rectifier device 49 and a passive load network therefor comprising the parallel combination of resistor 50, capacity 46, and condenser 47. In order to provide video-frequency demodulation, the time constant of the rectifier load network is made short with respect to the period of the highest video-frequency component to be detected, for reasons which are well known. The amplified replica of the input signal appearing across coil 45 is impressed across rectifier device 49 and its associated load circuit and is therefore demodulated, the detected signal appearing across resistor 50 and condenser 47. This detected signal is applied to second control grid 34 through coil 45 to modulate the electron flow to output electrode 35 in accordance with the modulation components, and amplification of the detected signal is accomplished by virtue of the transconductance of second control grid 34 with respect to output electrode 35, which works into the load circuit comprising resistor 55 and peaking coil 56. At the same time, the amplified video-carrier and sound-carrier components appearing at second control grid 34 are intermodulated by rectifier 49 and the resulting intercarrier-frequency signals, bearing the audio modulation, are amplified by virtue of the transconductance of second control grid 34 with respect to output electrode 35, working into tuned intercarrier-frequency load circuit 57. In this embodiment, battery 51 is selected to bias second control grid 34 to a relatively linear portion of its dynamic transfer characteristic, to provide video-frequency amplification with a minimum of distortion from tube characteristic curvature.

In order to provide efficient intermediate-frequency amplification of the wide-band picture signals, the several stages of intermediate-frequency amplifier 13 and load circuit 44 may be stagger-tuned in a manner well known in the art.

Merely by way of illustration, and in no sense by way of limitation, satisfactory operation of wave-signal translating apparatus 14 has been obtained at an intermediate-frequency of 45 megacycles with the following circuit components:

| | |
|---|---|
| Electron-discharge device 30 | Type 6BE6. |
| Rectifier device 49 | Type 1N64 crystal rectifier. |
| Resistor 39 | 220 ohms. |
| Resistor 42 | 10,000 ohms. |
| Resistor 50 | 4,700 ohms. |
| Resistor 53 | 1 megohm. |
| Resistor 55 | 4,700 ohms. |
| Condenser 41 | .001 microfarad. |
| Condenser 47 | 10 micro-microfarads. |
| Condenser 48 | .047 microfarad. |
| Battery 38 | 100 volts. |
| Battery 43 | 1.5 volts. |
| Battery 51 | 1.5 volts. |
| Battery 54 | 150 volts. |

Inductor 45 is made of suitable size to resonate at the intermediate-frequency with the capacity of the circuit from the second control grid to the cathode, comprising interelectrode capacity 46 and condensers 47 and 48. In the embodiment of Figure 1, it is of course possible to use a single cathode biasing network to provide operating bias for control grids 32 and 34, in lieu of using separate bias batteries 43 and 51. Comparison of this circuit with the combination of a conventional single-stage intermediate-frequency amplifier and crystal detector reveals that about 40% greater detected output may be obtained by the circuit of the present invention.

The embodiment of Figure 2 is generally similar to that illustrated in Figure 1 with the exception that demodulation of the amplified replica of the intermediate-frequency input signal is accomplished without the use of a crystal diode or other external rectifier device. In the circuit of Figure 2, the rectifier device and its associated load circuit are omitted from the second control grid-cathode circuit, and bias battery 51 is adjusted to bias second control grid 34 to a non-linear portion of its dynamic transfer characteristic. The amplified replica of the input signal developed across two-terminal load circuit 44 is impressed on second control grid 34 by virtue of the same circuit connection by which it is developed, and demodulation of the amplified replica is accomplished by anode-bend detection; in other words, since second control grid 34 is biased to a non-linear portion of its dynamic transfer characteristic, the electron flow to output electrode 34 is substantially modulated in accordance with the modulation components of the amplified input-signal replica. Intermodulation of the video-carrier and audio-modulated sound-carrier components, and amplification of the resulting intercarrier sound signals and the detected composite video signals form second control grid 34 to output electrode 35 are accomplished as before by virtue of the mixing action at the second control grid and the transconductance characteristic of the second control grid with respect to the output electrode.

It is also possible, in accordance with the invention, to effect demodulation of the amplified input-signal replica by other means included in the second control grid-cathode circuit and utilizing an operating characteristic of the second control grid. For example, a resistance-capacitance circuit having an appropriate time constant may be included in the second control grid-cathode circuit, and the second control grid may be biased to a non-linear portion of its grid current characteristic, so that demodulation of the amplified replica is accomplished by grid leak detection.

While satisfactory operation of the circuits of Figures 1 and 2 has been achieved, these circuits may exhibit a certain amount of instability due to the relatively high bilateral interelectrode capacity between grids 32 and 34, which may result in undesirable feedback from load circuit 44 to input grid 32. In the circuit of Figure 3, these undesirable effects are obviated by virtue of a special neutralizing circuit for providing degenerative feedback from two-terminal load circuit 44 to input control grid 32.

In Figure 3, the intermediate-frequency input signal from amplifier 13 (Figure 1) is applied across the primary winding 70 of an input transformer 71, the secondary winding 72 of which is coupled between input control grid 32 and grid resistor 42. The distributed capacity 73 between first control grid 32 and ground is shown in broken lines in the drawing. A neutralizing condenser 74 is connected from a tap 75 near the low-potential terminal of coil 45 to the low-potential terminal of secondary winding 72, and a second condenser 76 is connected from the low-potential terminal of secondary winding 72 to ground. Alternatively, windings 70 and 72 of input transformer 71 may be bifilar windings to provide a distributed capacity to ground equivalent to condenser 76. The rectifier load network comprising resistor 50 and condenser 47 is connected between the high-potential terminal of coil 45 and second control grid 34, in order to preclude feedback of the demodulated signal to the input grid.

In the circuit of Figure 3, condensers 74 and 76, distributed capacity 73, and the bilateral interelectrode capacity between control grids 32 and 34 constitute the four legs of a capacitive bridge network. By suitably selecting the value of neutralizing condenser 74, the degenerative feedback from two-terminal load circuit 44 to input control grid 32 may be made just sufficient to neutralize the regenerative feedback due to the bilateral interelectrode capacity between control grids 34 and 32.

In the circuit of Figure 1, the bandwidth of the two-terminal load circuit 44 across which the amplified input-signal replica is developed is dependent upon the damping of that circuit. A large part of this damping is attributable to rectifier device 49, and in some instances, this damping may be excessive. As illustrated in Figure 4, rectifier device 49 may be connected between a tap 80 on coil 45 and condenser 48 to reduce the damping of load circuit 44 to such an extent as to obtain the desired bandwidth.

Moreover, the obtainable input-frequency amplification with the circuit of Figure 1 is limited by the inclusion in the intermediate-frequency return path from coil 45 to ground of rectifier load condenser 47, which must be maintained at a small value to reduce attenuation at the higher video-frequencies and to make it possible to use a large rectifier load resistor 50. As shown in Figure 4, the intermediate-frequency impedance of the return path from coil 45 to ground may be reduced by including a series-resonant circuit, comprising an inductor 81 and a condenser 82, in parallel with rectifier load condenser 47, thereby to achieve increased intermediate-frequency amplification from input control grid 32 to second control grid 34. Inductor 81 and condenser 82 are tuned to the intermediate-frequency to provide a zero-impedance shunt across condenser 47 for the amplified input-signal replica. Moreover, the capacity of condenser 47 is reduced by an amount equal to the capacity of condenser 82 to increase the selectivity of load circuit 44 by enabling a larger rectifier load resistor 50 to be employed. In all other respects, the circuit of Figure 4 is identical to that of Figure 1.

In all of the embodiments of the invention thus far described, a single multigrid electron-discharge device has been employed to provide intermediate-frequency amplification, video demodulation, intercarrier sound detection, and amplification of both the intercarrier sound signals and the demodulated composite video signals. The invention may also be employed to advantage, however, in a television receiver in which the video and sound components of the intermediate-frequency composite television signals are detected in separate stages.

The television receiver illustrated in Figure 5 is specifically described and claimed in a copending divisional application, Serial No. 420,909, filed April 5, 1954, for "Wave-Signal Translating Apparatus," and assigned to the present assignee. In this instance, incoming composite television signals received by an antenna 90 are applied through a radio-frequency amplifier 91 to an oscillator-converter 92. Intermediate-frequency composite television signals from oscillator-converter 92 are applied to an intermediate-frequency amplifier 93, which may consist for example of three or four cascade-connected I. F. amplifier stages. Amplifier 93 is coupled to a video detector 94, which may be of conventional construction, and the detected composite video signals from detector 94 are amplified by a video amplifier 95 and applied to the input circuit of a cathode-ray tube 96 or other image-reproducing device. Composite video signals from video amplifier 95 are also applied to a synchronizing-signal separator 97, and the line-frequency and field-frequency synchronizing-pulse components from separator 97 are employed to control line-frequency and field-frequency scanning systems 98 and 99 which, in turn, provide suitable scanning signals to line-frequency and field-frequency deflection coils 100 and 101 respectively.

Intermediate-frequency amplifier 93 is also coupled by means of output circuit 103 to wave-signal translating apparatus 104 constructed in accordance with the present invention, where the intermediate-frequency signals are further amplified and the video-carrier and sound-carrier components are intermodulated and amplified to provide an amplified audio-modulated intercarrier-frequency sound signal. This amplified intercarrier-sound signal is applied to a limiter-discriminator 105, and the resulting audio-frequency signals, after amplification in audio circuits 106, are impressed on a loudspeaker 107 or other sound-reproducing device.

The receiver of Figure 5 may be of conventional construction with the exception of wave-signal translating apparatus 104. Apparatus 104 comprises a single electron-discharge device 108 including in the order named a cathode 109, a first control grid 110, an accelerating or screen grid 111, a second control grid 112 and an output electrode or anode 113. An additional screen grid 114 and a suppressor grid 115 may be provided between second control grid 112 and anode 113.

Intermediate-frequency composite television signals, including video-carrier and audio-modulated sound-carrier components separated by a predetermined frequency difference, are applied between first control grid 110 and cathode 109 by means of a coil 116 magnetically coupled to output circuit 103 of intermediate-frequency amplifier 93. Cathode 109 is connected to ground through a circuit comprising a resistor 117 and a condenser 118, and screen grids 111 and 114 are connected together and through a resistor 120 to the positive terminal of a battery 119 or other source of unidirectional operating potential, the negative terminal of which is grounded. Screen grids 111 and 114 are also bypassed to ground by means of condenser 121. Suppressor grid 115 is directly connected to ground.

A two-terminal load circuit, tuned to the receiver intermediate frequency and comprising an inductor 122 and an effective shunt capacity 123 which may be composed of distributed circuit and interelectrode tube capacities, has one terminal 124 coupled externally of device 108 to second control grid 112 only, through the parallel combination of a resistor 125 and a condenser 126. A parallel-resonant trap circuit 127 tuned to the intermediate frequency of the receiver may also be inductively coupled to inductor 122. The other terminal 128 of the two-terminal load circuit is coupled to cathode 109 through ground and the cathode bias circuit comprising resistor 117 and condenser 118.

Anode 113 is coupled to the positive terminal of a battery 129 or other suitable source of unidirectional operating potential through an intercarrier-frequency load circuit comprising an inductor 130 shunted by an effective capacity 131 which may be composed of distributed circuit capacities. Battery 129 is bypassed to ground by means of a condenser 132. Anode 113 is also coupled to limiter-discriminator 105 by means of a lead 133.

In operation, intermediate-frequency composite video signals, including video-carrier and audio-modulated sound-carrier components, are impressed on first control grid 110. Inductor 122 and effective shunt capacity 123 are tuned to the intermediate frequency, to provide an impedance at the frequencies of the carrier components greater than the reciprocal of the effective transconductance, at such frequencies, of first control grid 110 with respect to second control grid 112. Consequently, the video-carrier and sound-carrier components appear in amplified form at second control grid 112 by virtue of space charge coupling from first control grid 110 to second control grid 112. Trap circuit 127, also tuned to the intermediate frequency, may be provided for the purpose of emphasizing the carrier components by providing a double-peaked impedance characteristic for the two-terminal load circuit coupled to second control grid 112.

Second control grid 112 is biased to a non-linear portion of its dynamic transfer characteristic by means coupled to second control electrode 112 and to cathode 109. In the illustrated embodiment, this operating bias is provided by cathode resistor 117 and condenser 118 and further by resistor 125 and condenser 126 connected in the return path from second control grid 112 to ground; however, it may be possible by judicious design of the tube to operate second control grid 112 at zero bias, in which event the biasing means may consist of a direct connection between terminal 128 and cathode 109. Consequently, the video-carrier and audio-modulated sound-carrier components of the amplified signal appearing at second control grid 112 are subjected to anode-bend detection and are intermodulated by device 108 to provide an audio-modulated signal having a carrier frequency corresponding to the frequency separation between the video-carrier and sound-carrier components. Load circuit 130, 131 is tuned to the intercarrier frequency, and amplified intercarrier sound signals are developed at anode 113 by virtue of the transconductance characteristic of second control grid 112 with respect to anode 113. These intercarrier signals, bearing the audio modulation, are applied to limiter-discriminator 105 where they are detected to provide audio-frequency signals which are applied, after suitable amplification, to loudspeaker 107.

Resistor 125 and condenser 126, having a time constant which is short with respect to the highest-audio-frequency components, are preferably included in the circuit from second control grid 112 to cathode 109. Resistor-condenser network 125, 126 provides an automatic variation in the bias of second control grid 112 in accordance with the audio-frequency modulation components, thus tending to prevent the amplified intermediate-frequency signals from driving the second control grid beyond its linear operating range and thus avoiding undesirable modulation of the intercarrier sound signals by changes in picture carrier level in accordance with the video and synchronizing components.

In all embodiments of the invention, amplification of the modulated-carrier input signals is accomplished by virtue of space charge coupling between two control grids separated by an accelerating electrode. In each case, means associated with the second control grid are provided for effecting demodulation of the amplified replica of the input signal and for modulating the electron flow to the output electrode of the tube in accordance with modulation components of the amplified replica. These modulation components are then amplified by virtue of the transconductance of the second control grid with respect to the final anode or output electrode. In either case, the post-detection gain is proportional to the transconductance of the second control grid with respect to the anode. However, in the embodiments employing a separate rectifier for detection, the overall conversion gain is proportional to the transconductance or first derivative of anode current with respect to second-control-grid voltage at the operating point, while in embodiments employing anode-bend detection at the second control grid, the overall conversion gain is proportional to the first derivative of that transconductance or second derivative of anode current with respect to second-control-grid voltage, which is a measure of the degree of non-linearity of the dynamic transfer characteristic at the operating point.

Thus, the invention provides new and improved wave-signal translating apparatus for effectively accomplishing in a single stage and several functions of input-signal amplification, demodulation, and subsequent amplification of the modulation components. While the invention has been shown and described in the environment of a television receiver, it may also be used to advantage in other types of modulated wave-signal translating apparatus such as ultra-high frequency amplitude-modulation receivers. However, since the invention is dependent on the advantageous use of the space charge coupling effect, which is of useful magnitude only at relatively high frequencies, its utility is limited to applications at frequencies of the order of 1 megacycle or higher.

While particular embodiments of the present invention have been shown and described, it is apparent that numerous variations and modifications may be made, and it is therefore contemplated in the appended claims to cover all such variations and modifications as fall within the true spirit and scope of the invention.

I claim:

1. Wave-signal translating apparatus comprising: an electron-discharge device including, in the order named, a cathode, a first control grid, an accelerating electrode, a second control grid, and an output electrode; an input circuit for impressing an amplitude-modulated wave-signal, having a predetermined carrier frequency, between one of said control grids and said cathode; a circuit from the other of said control grids to said cathode including a resonant two-terminal load circuit having one terminal coupled externally of said device to said other control grid only and having an impedance at said predetermined frequency greater than the reciprocal of the effective transconductance, at said predetermined frequency, of said one control grid with respect to said other control grid for developing an amplified signal including modulation components of said modulated wave-signal; means coupled to said other control grid and said cathode for effecting separation of said modulation components from said amplified signal and for applying said separated modulation components to said other control grid to modulate the electron flow to said output electrode in accordance with said modulation components; and means including an output load circuit coupled to said output electrode and to said cathode and utilizing the transconductance of said other control grid with respect to said output electrode for amplifying said modulation components.

2. Wave-signal translating apparatus comprising: an electron-discharge device including, in the order named, a cathode, a first control grid, an accelerating electrode, a second control grid, and on output electrode; an input circuit for impressing an amplitude-modulated wave-signal, having a predetermined carrier frequency, between one of said control grids and said cathode; a circuit from the other of said control grids to said cathode including a resonant two-terminal load circuit having one terminal coupled externally of said device to said other control grid only and having an impedance at said predetermined frequency greater than the reciprocal of the effective transconductance, at said predetermined frequency, of said one control grid with respect to said other control grid for developing an amplified signal including modulation components of said modulated wave-signal; means coupled to said other control grid and said cathode and comprising a rectifier device included in said circuit from said other control grid to said cathode for effecting separation of said modulation components from said amplified signal and for modulating the electron flow to said output electrode in accordance with said modulation components; and means including an output load circuit coupled to said output electrode and to said cathode and utilizing the transconductance of said other control grid with respect to said output electrode for amplifying said modulation components.

3. Wave-signal translating apparatus comprising: an electron-discharge device including, in the order named, a cathode, a first control grid, an accelerating electrode, a second control grid, and an output electrode; an input circuit for impressing an amplitude-modulated wave-signal, having a predetermined carrier frequency, between said first control grid and said cathode; a circuit from said second control grid to said cathode including a resonant two-terminal load circuit having one terminal coupled externally of said device to said second control grid only and having an impedance at said predetermined frequency greater than the reciprocal of the effective transconductance, at said predetermined frequency, of said first control grid with respect to said second control grid for developing an amplified signal including modulation components of said modulated wave-signal by space charge coupling from said first control grid to said second control grid; means coupled to said second control grid and said cathode for effecting separation of said modulation components from said amplified signal and for applying said separated modulation components to said second control grid to modulate the electron flow to said output electrode in accordance with said modulation components; and means including an output load circuit coupled to said output electrode and to said cathode and utilizing the transconductance of said second control grid with respect to said output electrode for amplifying said modulation components.

4. Wave-signal translating apparatus comprising: an electron-discharge device including, in the order named, a cathode, a first control grid, an accelerating electrode, a second control grid, and an output electrode; an input circuit for impressing an amplitude-modulated wave-signal, having a predetermined carrier frequency, between said first control grid and said cathode; a circuit from said second control grid to said cathode including a resonant two-terminal load circuit having one terminal coupled externally of said device to said second control grid only and having an impedance at said predetermined frequency greater than the reciprocal of the effective transconductance, at said predetermined frequency, of said first control grid with respect to said second control grid for developing an amplified signal including modulation components of said modulated wave-signal; means coupled to said second control grid and said cathode and comprising a unilaterally conductive device included in said circuit from said second control grid to said cathode for demodulating said amplified signal to provide a detected signal comprising said modulation components and for modulating the electron flow to said output electrode in accordance with said detected signal; and means including an output load circuit coupled to said output electrode and to said cathode and utilizing the transconductance of said second control grid with respect to said output electrode for amplifying said detected signal.

5. Wave-signal translating apparatus comprising: an electron-discharge device including, in the order named, a cathode, a first control grid, an accelerating electrode, a second control grid, and an output electrode; an input circuit for impressing an amplitude-modulated wave-signal, having a predetermined carrier frequency, between said first control grid and said cathode; a circuit from said second control grid to said cathode including a resonant two-terminal load circuit having one terminal coupled externally of said device to said second control grid only and having an impedance at said predetermined frequency greater than the reciprocal of the effective transconductance, at said predetermined frequency, of said first control grid with respect to said second control grid for developing an amplified signal including modulation components of said modulated wave-signal; means coupled to said second control grid and said cathode for effecting demodulation of said amplified signal to provide a detected signal comprising said modulation components and for applying said detected signal to said second control grid to modulate the electron flow to said output electrode in accordance with said detected signal; means for neutralizing the bilateral interelectrode capacity between said control grids; and means including an output load circuit coupled to said output electrode and to said cathode and utilizing the transconductance of said second control grid with respect to said output electrode for amplifying said detected signal.

6. Wave-signal translating apparatus comprising; an electron-discharge device including, in the order named, a cathode, a first control grid, an accelerating electrode, a second control grid, and an output electrode; an input circuit for impressing an amplitude-modulated wave-signal, having a predetermined carrier frequency, between said first control grid and said cathode; a circuit from said second control grid to said cathode including a resonant two-terminal load circuit having one terminal coupled externally of said device to said second control grid only and having an impedance at said predetermined frequency greater than the reciprocal of the effective transconductance, at said predetermined frequency, of said first control grid with respect to said second control grid for developing an amplified signal including modulation components of said modulated wave-signal; means coupled to said second control grid and said cathode for effecting demodulation of said amplified signal to provide a detected signal comprising said modulation components and for applying said detected signal to said second control grid to modulate the electron flow to said output electrode in accordance with said detected signal; energy feedback means coupled between said two-terminal load circuit and said input circuit for neutralizing the bilateral interelectrode capacity between said control grids; and means including an output load circuit coupled to said output electrode and to said cathode and utilizing the transconductance of said second control grid with respect to said output electrode for amplifying said detected signal.

7. Wave-signal translating apparatus comprising: an electron-discharge device including, in the order named, a cathode, a first control grid, an accelerating electrode, a second control grid, and an output electrode; an input circuit for impressing an amplitude-modulated wave-signal, having a predetermined carrier frequency, between said first control grid and said cathode; a circuit from said second control grid to said cathode including a resonant two-terminal load circuit, comprising an inductor, having one terminal coupled externally of said device to said second control grid only and having an impedance at said predetermined frequency greater than the reciprocal of the effective transconductance, at said predetermined frequency, of said first control grid with respect to said second control grid for developing an amplified signal including modulation components of said modulated wave-signal; means coupled to said second control grid and said cathode for effecting demodulation of said amplified signal to provide a detected signal comprising said modulation components and for applying said detected signal to said second control grid to modulate the electron flow to said output electrode in accordance with said detected signal; an energy feedback circuit including a condenser coupled from said inductor to said input circuit for neutralizing the bilateral interelectrode capacity between said control grids; and means including an output load circuit coupled to said output electrode and to said cathode and utilizing the transconductance of said second control grid with respect to said output electrode for amplifying said detected signal.

8. Wave-signal translating apparatus comprising: an electron-discharge device including, in the order named, a cathode, a first control grid, an accelerating electrode, a second control grid, and an output electrode; an input circuit for impressing an amplitude-modulated wave-signal, having a predetermined carrier frequency, between said first control grid and said cathode; a circuit from said second control grid to said cathode including a resonant two-terminal load circuit having one terminal coupled externally of said device to said second control grid only and having an impedance at said predetermined frequency greater than the reciprocal of the effective transconductance, at said predetermined frequency, of said first control grid with respect to said second control grid for developing an amplified signal including modulation components of said modulated wave-signal; means coupled to said second control grid and said cathode, and comprising means included in said circuit from said second control grid to said cathode, for biasing said second control grid to a non-linear portion of its dynamic transfer characteristic, whereby said modulation components are separated from said modulated wave-signal, and for applying said separated modulation components to said second control grid to modulate the electron flow to said output electrode in accordance with said modulation components; and means including an output load circuit coupled to said output electrode and to said cathode and utilizing the transconductance of said second control grid with respect to said output electrode for amplifying said modulation components.

9. Wave-signal translating apparatus comprising: an electron-discharge device including, in the order named, a cathode, a first control grid, an accelerating electrode, a second control grid, and an output electrode; a source of composite television signals, including video-modulated image-carrier and audio-modulated sound-carrier components separated by a predetermined frequency difference, coupled to said first control grid and to said cathode; a resonant two-terminal load circuit having one terminal coupled externally of said device to said second control grid only and having an impedance throughout the frequency band of said composite television signals greater than the reciprocal of the effective transconductance, throughout said frequency band, of said first control grid with respect to said second control grid for developing amplified composite television signals; means coupled to said second control grid and said cathode for separating said modulation components from said modulated wave-signal and for applying said separated modulation components to said second control grid to modulate the electron flow to said output electrode in accordance with the modulation components of said amplified signals; and means utilizing the transconductance of said second control grid with respect to said output electrode, including a video-frequency output load circuit and a second output load circuit tuned to an intercarrier frequency corresponding to said frequency difference, for developing amplified composite video signals and amplified audio-modulated intercarrier-frequency output signals respectively.

10. Wave-signal translating apparatus comprising: an electron-discharge device including, in the order named, a cathode, a first control grid, an accelerating electrode, a second control grid, and an output electrode; a source of intermediate-frequency composite television signals including video-frequency picture-signal modulation components coupled to said first control grid and to said cathode; a circuit from said second control grid to said cathode including a resonant two-terminal intermediate-frequency load circuit having one terminal coupled externally of said device to said second control grid only for developing an amplified replica of said composite television signals; means coupled to said second control grid and said cathode for effecting separation of said modulation components from said amplified replica and for applying said separated modulation components to said second control grid to modulate the electron flow to said output electrode in accordance with the video-frequency picture-signal components of said amplified replica; and means including a video-frequency output load circuit coupled to said output electrode and to said cathode and utilizing the transconductance of said second control grid with respect to said output electrode for amplifying said video-frequency picture-signal components.

11. Wave-signal translating apparatus comprising: an electron-discharge device including, in the order named, a cathode, a first control grid, an accelerating electrode, a second control grid, and an output electrode; a source of composite television signals, including video-modulated image-carrier and audio-modulated sound-carrier components separated by a predetermined frequency difference, coupled to said first control grid and to said cathode; a resonant two-terminal load circuit having one terminal coupled externally of said device to said second control grid only and having an impedance throughout the frequency band of said composite television signals greater than the reciprocal of the effective transconductance, throughout said frequency band, of said first control grid with respect to said second control grid for developing an amplified signal including said carrier components; means coupled to said second control grid and said cathode for effecting separation of said image-carrier and sound-carrier components from said amplified signal and for applying said separated components to said second control grid to modulate the electron flow to said output electrode in accordance with the intermodulation product of said components corresponding to said predetermined frequency difference; and means, including an output circuit tuned to an intercarrier frequency corresponding to said predetermined frequency difference, coupled to said output electrode and to said cathode and utilizing the transconductance of said second control grid with respect to said output electrode for developing an amplified audio-modulated intercarrier-frequency output signal.

12. Wave-signal translating apparatus comprising: an electron-discharge device including, in the order named, a cathode, a first control grid, an accelerating electrode, a second control grid, and an output electrode; a source of composite television signals, including video-modulated image-carrier and audio-modulated sound-carrier components separated by a predetermined frequency difference, coupled to said first control grid and to said cathode; a resonant two-terminal load circuit having one terminal coupled externally of said device to said second control grid only and having an impedance at the frequencies of said carrier components greater than the reciprocal of the effective transconductance, at such frequencies, of said first control grid with respect to said second control grid for developing an amplified signal including said carrier components; means coupled to said second control grid and to said cathode for biasing said second control grid to a non-linear portion of its dynamic transfer characteristic, whereby said image-carrier and sound-carrier components of said amplified signal are separated from said amplified signal, and for applying said separated components to said second control grid to modulate the electron flow to said output electrode in accordance with the intermodulation product of said components corresponding to said predetermined frequency difference; and means, including an output circuit tuned to an intercarrier frequency corresponding to said predetermined frequency difference, coupled to said output electrode and to said cathode and utilizing the transconductance of said second control grid with respect to said output electrode for developing an amplified audio-modulated intercarrier-frequency output signal.

References Cited in the file of this patent

UNITED STATES PATENTS

| | | |
|---|---|---|
| 2,165,764 | Pitsch | July 11, 1939 |
| 2,205,243 | Dome | June 18, 1940 |
| 2,248,197 | Rath | July 8, 1941 |
| 2,274,184 | Bach | Feb. 24, 1942 |
| 2,532,793 | Sziklai | Dec. 5, 1950 |
| 2,547,145 | Adler | Apr. 3, 1951 |
| 2,616,035 | Adler | Oct. 28, 1952 |
| 2,616,036 | Adler | Oct. 28, 1952 |